Sept. 19, 1972  A. J. MELAJA  3,692,582
PROCEDURE FOR THE SEPARATION OF FRUCTOSE FROM THE
GLUCOSE OF INVERT SUGAR
Filed July 31, 1970

INVENTOR
ASKO J. MELAJA

BY *Stevens, Davis, Miller & Mosher*
ATTORNEYS

3,692,582
PROCEDURE FOR THE SEPARATION OF FRUCTOSE FROM THE GLUCOSE OF INVERT SUGAR

Asko J. Melaja, Kantvik, Finland, assignor to Suomen Sokeri Osakeyhtio (Finnish Sugar Company), Helsinki, Finland
Filed July 31, 1970, Ser. No. 59,987
Int. Cl. C13k 3/00, 9/00
U.S. Cl. 127—46 A    8 Claims

ABSTRACT OF THE DISCLOSURE

Process for separating fructose from an aqueous invert sugar solution involving supplying the invert sugar solution to a 2.5–5 meter column of an alkaline earth metal salt of a polystyrene sulfonate-divinylbenzene cation exchange resin. Three fractions are collected: a glucose-rich fraction, a fraction containing glucose and fructose and a fructose-rich fraction.

---

Figure 1:
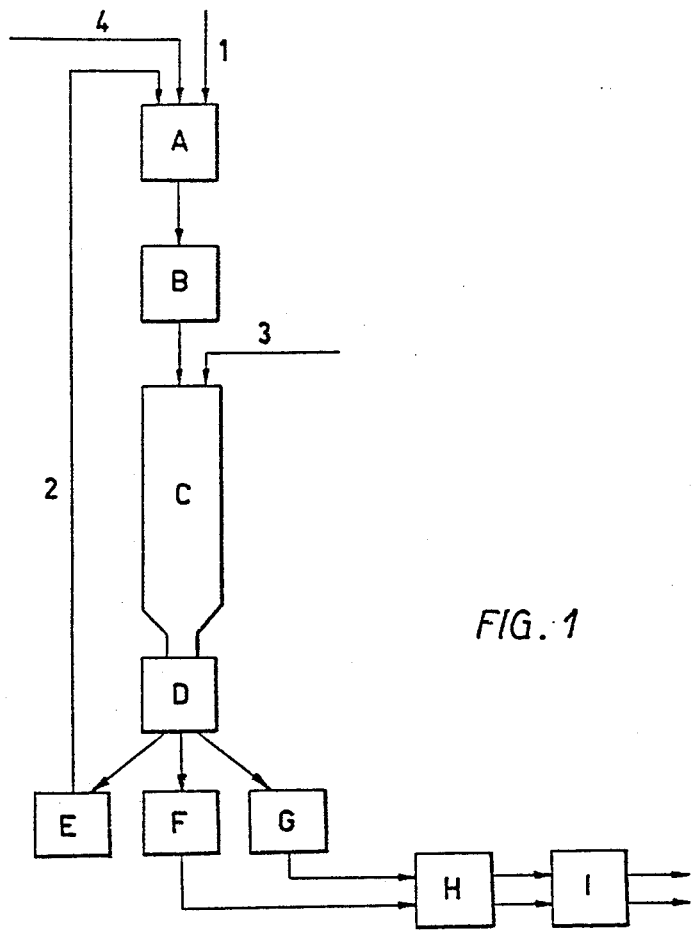

The present invention is concerned with a procedure for the separation of fructose from the glucose of invert sugar. It is a known procedure to separate two monosaccharides of invert sugar, fructose and glucose, from each other by means of a suitable porous cation exchange resin, whereby the invert sugar solution carried along with the water stream is divided into a glucose-rich and a fructose-rich solution part. For this purpose it is a known procedure to use, e.g., polystyrene sulphonate cation exchange resin, in which case the best result is obtained when 2 to 6 percent of di-vinyl benzene has been crosscoupled with the said resin during its preparation. Moreover, it has been ascertained that hereby by means of a resin in alkaline earth metal form a better separation is achieved than by means of a resin in alkali metal form. In practice the calcium form has proved advantageous.

The procedures so far known for the separation of fructose and glucose from each other are, however, technically complicated, the separation degree is relatively poor, and their economy is questionable.

In the U.S. Pat. No. 3,044,904 the theoretic basis for the separation of fructose and glucose is described. The method specified therein is poorly suitable for technical separation. For the achievement of a better degree of separation the patent suggests recirculating of the collected fractions. The British Pat. No. 1,083,500 describes a technically highly complicated method according to which several fractions are recirculated.

In the process for the separation of fructose from glucose one important problem is uniform supply of the invert sugar solution onto the resin surface in the resin column, because uniform supply of the solution onto the resin surface is difficult. The more fractions recirculated, i.e. fed to the resin surface, the more multiple become the disturbances caused by the supply, in other words, the disturbances caused by the supply are duplicated.

By means of the present invention an "ideal separation" has been achieved, whereby no fraction is supplied to the resin surface. Moreover, a procedure has been produced that is technically simple to carry into effect, for the separation of fructose from glucose, whereby at the same time a very good degree of separation is obtained and whereby the fractions to be recirculated comprise only one fraction which can as such, without further treatment, be utilized in the process for diluting the invert sugar solution. The separation of fructose from glucose is according to the invention achieved highly economically.

The invention is based on the surprising observation that by making the normal resin height used in known methods (0.6 to 1.8 meters) considerably higher, the separation of fructose and glucose takes place faster and more completely. By making use of this observation, according to the invention a technically and economically highly practical method has been produced for the separation of the said monosaccharides from each other.

The procedure according to the invention for the separation of fructose from the glucose of invert sugar by supplying an invert sugar solution containing fructose and glucose and water by periods and as a continuous process through a column which contains, submerged in water, cation exchange resin of a salt, favourably in an alkaline earth metal such as calcium form, favourably polystyrene sulphonate cation exchange resin with which divinyl benzene has been cross-coupled, is mainly characterized in that the invert sugar solution is supplied into the column with a dry material content of 25 to 55 percent by weight and with a flow rate of 0.2 to 1.5 cubic metres per hour and per square metre of the cross section of the resin column, depending on the operating temperature and on the size of the resin globules, between the obtained glucose fraction and the obtained fructose fraction, for diluting the invert sugar solution to be supplied, a return fraction is collected, the dry material content of which is not higher than 35 percent by weight, favourably not higher than 25 percent by weight as calculated from the invert sugar supplied, and that the height of the said resin in the column is about 2.5 to 5 m., favourably 3 to 4 m.

The present invention and its other characteristics are described below under reference to the attached drawing, in which FIG. 1 shows a schematic view of the process according to the invention.

In the process according to the invention the thick sugar solution 1 coming from the sugar works is diluted at phase A by means of a return fraction 2 (which will be described more closely later on) and the diluted sugar solution is inverted at phase B in a way in itself known. The invert sugar solution is supplied into the column C, which has the cation exchange resin described above as submerged in water. After the invert sugar batch a calculated quantity of water 3 is supplied into the column and after that another batch of invert sugar. Thus, the supplying of invert sugar and water takes place as subsequent periods so that after the invert sugar solution water is always supplied into column C. Glucose is retained by the resin more weakly than frustose and proceeds faster into the water batch flowing ahead. By the time the batch (glucose, return and fructose fractions) preceding this water batch has left the column, the glucose has had time to be enriched at the lower part of the said water batch, whereas fructose is enriched at its upper part (with the more weakly separated part—the return fraction—in the middle). The solution flowing out of the column is alternatingly directed into the glucose container (container G), return container (container E) and into the fructose container (container F), in this given order. The directing is controlled by means of an analyser D which is based, e.g. on the property of glucose and fructose solutions to turn the polarisation level of polarised light and on the specific weights or refraction index of the solutions. The obtained glucose and fructose solutions are separately directed to evaporation H and crystallisation I. The obtained crystals are thereafter isolated and dried.

The purity degree of the glucose and fructose solutions taken out of the column C is 95 to 97 percent of glucose or, respectively, fructose calculated from the dry material content. As we know, the purity of fructose and glucose solutions has a decisive importance for their crystallisation and for the capacity of the process. A purity of 95 percent in the solutions is here already to be considered as technically satisfactory and a purity of 97 percent as excellent. In the process according to the invention the degree of purity of the fructose respectively glucose solution reaches 100 percent, but a solution rich in fructose respectively glucose is directed into the containers F and G until the average degree of purity of the whole fraction is about 95 to 97 percent. Besides as crystalline, fructose is also marketed as a solution, in which case its degree of purity shall be about 95 percent. So the fructose solution obtained from the column C is a finished product solution complying with the requirements of commercial quality.

Figure 2:
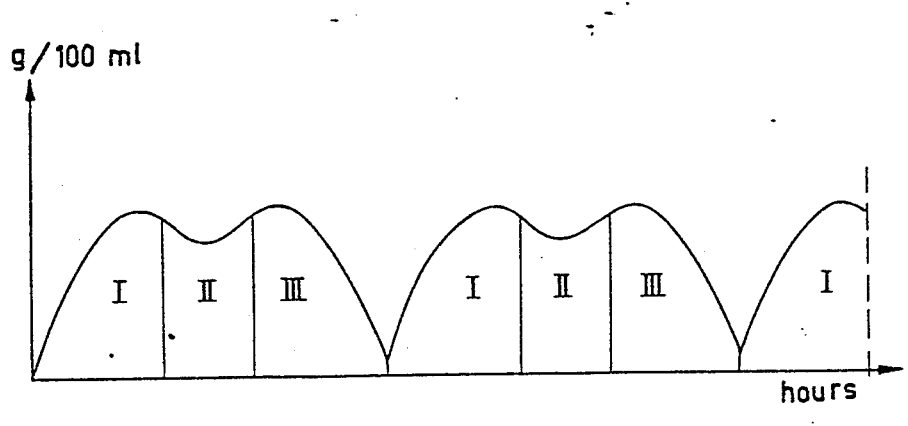

FIG. 2 presents graphically the fractions removed out of the column, whereby the ordinate shows the dry material content g./100 ml. of the different fractions and the absciss shows the time in hours. The column gives successively and repeatedly the glucose fraction I, the return fraction II, and the fructose fraction III, in the said order. The zero point represents the starting of the process.

In the process according to the invention as the resin is advantageously used polystyrene sulphonate cation exchange resin in calcium form and cross-coupled with divinyl benzene. The technically suitable average globule size of the resin is 35 to 80 mesh (Tyler) or 0.15 to 0.4 mm., whereby maximum uniformity of globule size is aimed at. The continuous flowing speed in the column is 0.2 to 1.5 m.$^3$ per hour and per one m.$^2$ of the cross section of the resin column. The temperature in the column can be 50 to 75° C., but lower temperatures can also be used, e.g. the room temperature, in which case the capacity, however, decreases accordingly. The dry material content of the sugar solution supplied into the column can be 25 to 55 percent by weight.

The equipment for carrying into effect the procedure described above, comprises a column C which has polystyrene sulphonate cation exchange resin favourably in calcium form, devices for supplying the invert sugar solution into the column C, and devices for supplying water 3 into the column C, and which equipment is characterized in that the equipment comprises devices for dividing the solution leaving the said column C into 3 fractions, a glucose-rich (purity 95 percent or higher), a fructose-rich (purity 95 percent or higher), and a return fraction, devices for directing the said 3 fractions into their respective separate containers (G, E, F) and devices for supplying the return fraction to the dilution of the thick sugar solution.

In connection with the invention tests have been made in order to determine what significance the height of the resin layer has for the separation result and for the capacity. In the tests a column was used whose cross section area was one square metre.

As comes out from the following table, the fructose yield with a 1.5 m. resin layer is 17 percent by weight and rises with the same supply rate to 37 percent by weight when the resin height is increased to 2.5 m. With a resin height of 3.5 m. the yield is 39 percent by weight of fructose with a supply of 100 kg. With the resin heights of 4.25 and 5.0 m. and with supplies of 125 kg. the yield is 34 percent by weight. The table gives different supply rates for one resin height as a reference value, which rates indicate the direction for finding a suitable supply rate under given circumstances. The dry material contents g./100 ml. of the fructose fraction given in the table means that the higher the content is the lower are the evaporation costs.

TABLE

| Height of the resin layer, m. | Supply of invert sugar (dry material quantity) | Separation result percent by weight calculated from the supplied invert sugar (dry material quantity) | | Average dry material content of the fructose fraction, g./100 ml. | Capacity of the column kgs. of fructose per hour with the highest permitted supply rate |
|---|---|---|---|---|---|
| | | 95% pure fructose | Return fraction | | |
| 1.5 | 75 | 20 | 50 | 8 | 8 |
| 1.5 | 100 | 17 | 55 | 8 | 9 |
| 2.0 | 75 | 30 | 36 | 7 | 11 |
| 2.0 | 100 | 27 | 41 | 8 | 13 |
| 2.0 | 125 | 23 | 47 | 9 | 12 |
| 2.5 | 75 | 37 | 25 | 8 | 15 |
| 2.5 | 100 | 35 | 28 | 9 | 17 |
| 2.5 | 125 | 31 | 31 | 10 | 16 |
| 3.5 | 100 | 39 | 15 | 10 | 18 |
| 3.5 | 125 | 36 | 17 | 12 | 21 |
| 3.5 | 150 | 34 | 24 | 12 | 20 |
| 4.25 | 150 | 34 | 28 | 11 | 18 |
| 5.00 | 125 | 34 | 28 | 9 | 14 |
| 5.00 | 150 | 32 | 33 | 11 | 16 |

The capacity values of the column also increase substantially when the height of the resin layer is increased, as comes out from the last column of the table. On the basis of the tests carried out it has been ascertained that the suitable height of the resin layer for the purposes according to the present invention is about 2.5 to 5 m. and advantageously 3 to 4 m.

The percentage of glucose has been left out from the above table, but it can be obtained by reducing the sum of the percentage values of the fructose fraction and the return fraction from one hundred. The subject of the present invention is in particular the collecting of the fructose from the invert sugar, because fructose is considerably more important as a product than glucose, which is collected in this process mainly as a by-product. For this reason the collecting of fructose has an essential significance in connection with the present invention.

As has been explained above, by means of the separation treatment according to the present invention the fructose and glucose solutions are obtained directly by means of one flowing through the column as product solutions without the necessity of returning them for a renewed treatment in the column. Only the fraction between the glucose and fructose fractions is returned to the circulation and favourably for dilution of the thick sugar solution for inversion. For this purpose the dry material content of the return fraction should be not higher than 35 percent by weight, favourably not higher than 25 percent by weight as calculated from the invert sugar supplied. If the dry material quantity percent is higher than the supply, it causes additional evaporation [the dry material content (g./100 ml.) in the return fraction remains by and large constant, whereby with an increase in the dry material quantity the volume of the liquid increases accordingly] or, if no additional evaporation is carried out, more diluted product solutions are obtained. Here, on the other hand, the dry material content of the product solutions affects the evaporation cost.

Should the dry material quantity of the return fraction coming from the container E to the dilution A be in some case too small (the liquid quantity smaller accordingly, the lacking quantity of water 4 can be added to the dilution. In such a case too little use has been made of the capacity of the equipment, and by increasing the quantity of the invert sugar supplied it is possible to make the return fraction larger. Thus, this latter case does not cause any additional costs, as is the situation in the former case, in which the dry material quantity of the return fraction, as calculated from the invert sugar supplied, is higher than 35 percent by weight (with a resin height of 1.5 m. 50 to 55 percent by weight).

As comes out from the table presented, the return fractions 50 and 55 as well as 36, 41 and 47 percent by weight, obtained using resin layer heights of 1.5 and 2 m., cannot be used for diluting as out of reasons given above, unevaporated. Instead, the return fractions obtained when using resin layer heights 2.5 m. (supplies 75 kg. and 100 kg.) 3.5 m., 4.25 m. and 5 m. (supply 125 kg.) can be used with a good result for diluting the thick sugar solution.

What I claim is:

1. A process for separating fructose from an aqueous invert sugar solution which comprises:
   (a) providing a column of alkaline earth metal salt of a polystyrene sulfonate cation exchange resin cross-coupled with di-vinyl benzene, the column having a height of from about 2.5 to about 5 meters,
   (b) submerging the column of resin in water,
   (c) feeding an aqueous invert sugar solution having a dry material content of 25 to 55% by weight in uniform supply to the resin surface in the column at a flow rate of 0.2 to 1.5 cubic meters per hour per square meter of the cross-section of the resin column, and
   (d) recovering successively from the downstream side of the resin bed (1) a glucose fraction, (2) a fraction containing glucose and fructose, and (3) a fructose fraction, the fraction (2) being not higher than 35% dry material by weight as calculated from the invert sugar supply.

2. A process for separating fructose from an aqueous invert sugar solution which comprises:
   (a) providing a column of alkaline earth metal salt of a polystyrene sulfonate cation exchange resin cross-coupled with di-vinyl benzene, the column having a height of from 2.5 to about 5 meters,
   (b) submerging the column of resin in water,
   (c) feeding an aqueous invert sugar solution having a dry material content of 25 to 55% by weight in uniform supply to the resin surface in the column at a flow rate of 0.2 to 1.5 cubic meters per hour per square meter of the cross-section of the resin column,
   (d) recovering successively from the downstream side of the resin bed (1) a glucose fraction, (2) a fraction containing glucose and fructose, and (3) a fructose fraction, the fraction (2) being not higher than 35% dry material by weight as calculated from the invert sugar supply, and
   (e) returning the fraction (2) containing fructose and glucose as a diluent to provide, with new feed stock, the invert sugar solution (c) above.

3. The process of claim 2, wherein the dry material content of the fraction (2) is not higher than 25% by weight, as calculated from the invert sugar supplied, and wherein the resin column has a height of 3 to 4 meters.

4. The process of claim 2, wherein the alkaline earth metal salt of a polystyrene sulfonate cation exchange resin is a calcium salt.

5. The process of claim 2, wherein the invert sugar solution (c) is followed by a quantity of water to the column and the quantity of water is followed by a new batch of invert sugar solution (c), the quantities of the respective batches of invert sugar solution and water being calculated to provide successive fractions through the column comprising a first fraction containing not less than 95% glucose based on weight of dry substance, a second return fraction containing fructose and glucose, and a third fraction containing not less than 95% fructose based on weight of dry substance.

6. The process of claim 2, wherein the glucose and fructose fractions are evaporated and the sugar is crystallized therefrom.

7. The process of claim 2, wherein the fructose fraction contains not less than about 95% fructose based on weight of dry substance and the glucose fraction contains not less than 95% glucose based on weight of dry substance.

8. A process for separating fructose from an aqueous invert sugar solution which comprises:
   (a) providing a column of calcium salt of a polystyrene sulfonate cation exchange resin cross-coupled with di-vinyl benzene, the column having a height of from 3 to 4 meters,
   (b) submerging the column of resin in water,
   (c) feeding an aqeuous invert sugar solution, having a dry material content of 25 to 55% by weight, in uniform supply to the upper surface of the resin column at a flow rate of 0.2 to 1.5 cubic meters per hour per square meter of the cross-section of the resin column, while removing liquid from the bottom of the resin column at the same rate,
   (d) recovering successively from the downstream side of the resin bed (1) a glucose fraction having a purity of at least 95% by weight of glucose on dry substance, (2) a return fraction containing fructose and glucose and containing not more than 35% dry material by weight, as calculated from the invert sugar supply, and (3) a fructose fraction containing at least 95% by weight of fructose on dry substance, and
   (e) returning the return fraction (2) as a diluent to provide, with new feed stock, the aqueous invert sugar solution of (c) above.

References Cited

UNITED STATES PATENTS

| | | | |
|---|---|---|---|
| 3,416,961 | 12/1968 | Mountfort | 127—46 |
| 2,818,851 | 1/1958 | Khym | 127—46 |
| 3,044,905 | 7/1962 | Lefevre | 127—46 |
| 3,044,906 | 7/1962 | Lefevre | 127—46 |
| 3,471,329 | 10/1969 | Quietensky | 127—46 |
| 3,483,031 | 12/1969 | Lauer | 127—46 |

MORRIS O. WOLK, Primary Examiner

S. MARANTZ, Assistant Examiner

U.S. Cl. X.R.

127—9

PO-1050
(5/69)

UNITED STATES PATENT OFFICE
CERTIFICATE OF CORRECTION

Patent No. 3,692,582      Dated September 19, 1972

Inventor(s) Asko J. Melaja

It is certified that error appears in the above-identified patent and that said Letters Patent are hereby corrected as shown below:

Column 5, line 35, "from 2.5 to" should be --from about 2.5 to--.

Signed and sealed this 6th day of February 1973.

(SEAL)
Attest:

EDWARD M. FLETCHER, JR.
Attesting Officer

ROBERT GOTTSCHALK
Commissioner of Patents